(12) United States Patent
Frye et al.

(10) Patent No.: US 9,975,104 B2
(45) Date of Patent: May 22, 2018

(54) PROCESSING UNIT AND USE OF A PLURALITY OF PROCESSING UNITS

(71) Applicant: BAYER AKTIENGESELLSCHAFT, Leverkusen (DE)

(72) Inventors: Lars Frye, Leichlingen (DE); Florian Lipski, Düsseldorf (DE); Stefan Schmitz, Köln (DE); Nicolai Krasberg, Langenfeld (DE); Dietmar Günther, Hückeswagen (DE); Carsten Meyer, Köln (DE); Carsten Conzen, Leverkusen (DE); Ulrich Liesenfelder, Bergisch Gladbach (DE); Ingo Steinmeister, Leverkusen (DE); Karl-Robert Boos, Burscheid (DE); Wolfgang Güdel, Neuss (DE); Karl-Hermann Koeching, Dormagen (DE)

(73) Assignee: BAYER AKTIENGESELLSCHAFT, Leverkusen (DE)

( * ) Notice: Subject to any disclaimer, the term of this patent is extended or adjusted under 35 U.S.C. 154(b) by 351 days.

(21) Appl. No.: 14/648,417

(22) PCT Filed: Dec. 18, 2013

(86) PCT No.: PCT/EP2013/077053
§ 371 (c)(1),
(2) Date: May 29, 2015

(87) PCT Pub. No.: WO2014/095974
PCT Pub. Date: Jun. 26, 2014

(65) Prior Publication Data
US 2015/0298094 A1      Oct. 22, 2015

(30) Foreign Application Priority Data

Dec. 20, 2012  (DE) .................... 10 2012 112 815

(51) Int. Cl.
*B01J 19/24* (2006.01)
*F16M 1/00* (2006.01)

(52) U.S. Cl.
CPC ............ *B01J 19/24* (2013.01); *F16M 1/00* (2013.01); *B01J 2219/00002* (2013.01); *B01J 2219/00022* (2013.01); *B01J 2219/24* (2013.01)

(58) Field of Classification Search
CPC .............. B01J 2219/0002; B01J 2219/00002
See application file for complete search history.

(56) References Cited

U.S. PATENT DOCUMENTS

| 6,596,174 B1 * | 7/2003 | Marcus | B01D 36/003 210/104 |
| 2007/0100178 A1 * | 5/2007 | Carstens | B01J 7/02 585/15 |

(Continued)

FOREIGN PATENT DOCUMENTS

| FR | 2 716 176 A1 | 8/1995 |
| FR | 2 837 495 A1 | 9/2003 |

(Continued)

OTHER PUBLICATIONS

International Search Report dated Apr. 4, 2014, dated Apr. 14, 2014.
(Continued)

*Primary Examiner* — Lessanework Seifu
(74) *Attorney, Agent, or Firm* — McBee Moore Woodward & Vanik IP, LLC

(57) ABSTRACT

Processing unit for assisting and/or performing a processing basic operation for a chemical reaction, with an operating unit for preparing a contribution for the processing basic operation and a frame for accommodating the operating units, the frame having an extension $d_L$ in the longitudinal direction which corresponds substantially to an integral multiple $Z_L$ of an integral portion $N_L$ of an extension $L_L$, in (Continued)

the longitudinal direction of an interior of a standard transport container, in accordance with DIN ISO 668, and/or the frame having an extension $d_Q$ in the transverse direction with corresponds substantially to an integral multiple $Z_Q$ of an integral portion $N_Q$ of an extension $L_Q$ in the transverse direction of an interior of a standard transport container, in particular in accordance with DIN ISO 668, wherein different processing units can be stored in a pool for different processing basic operations and be assembled in modular and flexible manner in the standard transport container for the synthesis of a given chemical product.

18 Claims, 3 Drawing Sheets

(56) References Cited

U.S. PATENT DOCUMENTS

| | | | |
|---|---|---|---|
| 2011/0163462 A1* | 7/2011 | Lang | B01J 19/00 260/1 |
| 2012/0024740 A1 | 2/2012 | Gollnick et al. | |

FOREIGN PATENT DOCUMENTS

| | | |
|---|---|---|
| WO | 02/49941 A1 | 6/2002 |
| WO | 2010/066281 A1 | 6/2010 |

OTHER PUBLICATIONS

English Translation of International Search Report dated Apr. 4, 2014, dated Apr. 14, 2014.

* cited by examiner

PROCESSING UNIT AND USE OF A PLURALITY OF PROCESSING UNITS

This is a 371 of PCT/EP2013/077053 filed 18 Dec. 2013, which claims foreign priority benefit under 35 U.S.C. 119 of German Patent Application 10 2012 112 815.4 filed Dec. 20, 2012, the entire contents of which are incorporated herein by reference.

BACKGROUND OF THE INVENTION

The work which led to this invention was funded under the grant agreement No. 228867 in the course of the Seventh Framework Program of the European Union FP7/2007-2013.

The invention relates to a processing unit and also to use of a plurality of such processing units, using which, a process engineering unit operation can be carried out or at least supported, in order to carry out a chemical reaction.

For the production of a chemical product, it is necessary, for the desired synthesis of the chemical product that is to be produced, to assemble an individually designed plant structure in order to be able to carry out the necessary industrial processing steps. When the production of this product is no longer wanted, the plant structure is usually demolished again or disassembled, in order to assemble, on the same site, a different individually designed plant structure with which a different chemical product can be produced.

There is a constant need to decrease the expenditure for carrying out differing chemical reactions.

It is the object of the invention to specify measures which permit different chemical reactions to be carried out with a low expenditure.

SUMMARY OF THE INVENTION

According to the invention, a processing unit is provided for supporting and/or carrying out a process engineering unit operation for a chemical reaction, having an operating unit for providing a contribution to the process engineering unit operation and a frame for accommodating the operating unit, wherein the frame has an extension & in the longitudinal direction which corresponds substantially to an integral multiple $Z_L$ of an integral portion $N_L$ of an extension $L_L$ in the longitudinal direction of an interior of a standard transport container, in particular as specified in DIN ISO 668, and/or the frame has an extension $d_Q$ in the transverse direction which corresponds substantially to an integral multiple $Z_Q$ of an integral portion $N_Q$ of an extension $L_Q$ in the transverse direction of an interior of a standard transport container, in particular as specified in DIN ISO 668.

The standard transport container which is, in particular, a transport container of the 1C type ("20 foot container") as specified in DIN ISO 668, or of the 1D type ("10 foot container") as specified in DIN ISO 668 is an internationally usual standard, the extension of which in the longitudinal direction, transverse direction and height is substantially internationally standardized. In the case of a rectangular base area of the interior of the standard transport container, the longer side defines the longitudinal direction and the shorter side the transverse direction. Such a standard transport container can be used, in particular, for transport by a truck and/or a marine container ship. For instance, the interior of the standard transport container of the 1C type has a length $L_L$ of 5867 mm, a width $L_Q$ of 2330 mm and a height $L_H$ of 2197 mm, whereas the interior of the standard transport container of the 1D type has a length $L_L$ of 2802 mm, a width $L_Q$ of 2330 mm and a height $L_H$ of 2197 mm. The available storage space of this standard transport container is subdivided into a plurality of equally sized notional logical areas. The footprint of the processing unit substantially corresponds exactly to this logical area or an integral multiple of this logical area, wherein, in the dimensioning of the processing unit footprint delimited by the frame, some air can be provided between adjacent logical areas of the standard transport container ("clearance").

DETAILED DESCRIPTION

Preferably, a standard transport container of the 1C type is subdivided in the longitudinal direction with $N_L=10$ and in the transverse direction with $N_Q=4$, in such a manner, that with $Z_L=1$ and $Z_Q=1$, for the frame, a minimal extension in the longitudinal direction of $d_{L,min}=570$ mm±15 mm can result and a minimal extension in the transverse direction of $d_{Q,min}=570$ mm±5 mm can result. The processing engineering unit operation supported and/or to be carried out by the processing unit, as a result, needs to take place, in particular, in principle on an area of $d_{L,min} \times d_{Q,min}$. If this area should not be sufficient for this purpose, the frame can be enlarged in the longitudinal direction and/or transverse direction by an integral multiple, in such a manner that the process engineering unit operation supported and/or to be carried out by the processing unit can take place on an area of a maximum of $(Z_L\ d_{L,min}) \times (Z_Q\ d_{Q,min})$, wherein $Z_L \le N_L$ and $Z_Q \le N_Q$. For the extension of the frame in the longitudinal direction, therefore, $d_L = Z_L\ d_{L,min}$ where $Z_L=1 \ldots N_L$, whereas for the extension of the frame in the transverse direction $d_Q = Z_Q\ d_{Q,min}$ where $Z_Q=1 \ldots N_Q$. In addition, $N_L$, $N_Q$, $Z_L$, $Z_Q \in \mathbb{N}$. Preferably, $2 \le N_L \le 40$, in particular $3 \le N_L \le 20$, preferably $4 \le N_L \le 10$, and particularly preferably $5 \le N_L \le 8$. Preferably, $2 \le N_Q \le 10$, in particular $3 \le N_Q \le 8$, and particularly preferably $4 \le N_Q \le 6$. If a clearance $S_L$ is provided between adjacent processing units in the longitudinal direction, and/or a clearance $S_Q$ is provided in the transverse direction, preferably this clearance S is taken into consideration in the determination of $d_L$ and $d_Q$, in such a manner that a constant stepwise increment of the standard transport container can be retained. In this case, in particular, $d_L = Z_L\ d_{L,min} + (Z_L-1)\ S_L$, where $Z_L=1 \ldots N_L$ and/or $d_Q = Z_Q\ d_{Q,min} + (Z_Q-1)\ S_Q$, where $Z_Q=1 \ldots N_Q$.

In particular, the extension of the frame in the longitudinal direction and in the transverse direction is selected in such a manner that, in the case of a maximum possible number of processing units in the standard transport container, over 95% of the available storage space of the standard transport container is used by the processing units. Preferably, $0.9 \le (N_L\ d_{L,min})/L_L \le 1.0$, in particular $0.95 \le (N_L\ d_{L,min})/L_L \le 0.99$ and particularly preferably $0.97 \le (N_L\ d_{L,min})/L_L \le 0.98$. Correspondingly, in particular $0.9 \le (N_Q\ d_{Q,min})/L_Q \le 1.0$, in particular $0.95 \le (N_Q\ d_{Q,min})/L_Q \le 0.99$ and particularly preferably $0.97 \le (N_Q\ d_{Q,min})/L_Q \le 0.98$. Preferably, $0.95 \le [(N_L\ d_{L,min})\ (N_Q\ d_{Q,min})]/(L_L\ L_Q) \le 1.0$, and particularly preferably $0.97 \le [(N_L\ d_{L,min})\ (N_Q\ d_{Q,min})]/(L_L\ L_Q) \le 0.99$. In particular, $450\ \text{mm} \le d_{L,min} \le 650$ mm, preferably $500\ \text{mm} \le d_{L,min} \le 600$ mm, and particularly preferably $d_{L,min} = °570$ mm±15 mm. Correspondingly, in particular $450\ \text{mm} \ge d_{Q,min} \le 650$ mm, preferably $500\ \text{mm} \le d_{Q,min} \le 600$ mm, and particularly preferably $d_{Q,min} = °570$ mm±5 mm.

Via this standardization of the dimensioning of the processing unit, it is possible to place a plurality of processing units which support and/or are to carry out differing process engineering unit operations for the planned chemical reaction, in particular a chemical batch reaction and/or a continuous chemical reaction, in the standard transport container in an ordered structure within the standard transport container and to connect them to one another, in particular for mass transfer and/or energy exchange and/or information exchange. The system structure realized within the standard transport container can be composed of a plurality of standardized processing units connected to one another in such a manner that it is possible, for example, to have various processing units available for various process engineering unit operations in a pool, and, depending on the necessary system structure, to assemble them flexibly for the synthesis of a certain chemical product in a modular manner in the standard transport container, as a result of which carrying out different, in particular continuous, chemical reactions with low expenditure is permitted.

A process engineering unit operation is taken to mean in principle any process in which at least one material is changed with respect to type, quality and/or composition, in particular by using physicochemical or biological processes. Preferably, in the processing unit, only exactly one process engineering unit operation is carried out, as a result of which the exchangeability and reusability for different chemical reactions is improved. A process engineering unit operation is, for example, mixing, separating, agglomerating, comminuting, heating, cooling, drying, filtering, distilling, oxidizing, hydrogenating. Polymerizing, fermenting, galvanizing. The process engineering unit operation supported and/or carried out by the operating unit of the processing unit extends, in particular, beyond pure mass transport, and is not restricted to storage or transporting.

In particular, the frame has substantially vertically running support struts. Preferably, four support struts are provided which are arranged in the corners of a notional rectangle having the edge lengths $d_L$ and $d_Q$. The support struts can be connected to one another via substantially horizontally running bases and/or substantially vertically running side walls and/or connection struts. The frame can delimit a volume in which the operating unit is positioned. The operating unit can be connected to the frame substantially immovably. In particular, suitable recesses are provided in the frame which permit connection of the operating unit to at least one other operating unit of a different processing unit.

In particular, the frame has a height $d_H$ which corresponds substantially to an integral multiple $Z_H$ of the integral portion $N_L$ of the extension $L_L$ in the longitudinal direction or of the integral portion $N_Q$ of the extension $L_Q$ in the transverse direction of the interior of the standard transport container. This permits in particular the dimensions of the processing unit to be configured substantially in the manner of a cube and/or to be composed of notional cubes. In particular, $d_H = Z_H L_L/N_L$ or $d_H = Z_H L_Q/N_Q$. Preferably, $d_H = Z_H d_{L,min}$ or $d_H = Z_H d_{Q,min}$, where $d_{L,min}$ and/or $d_{Q,min}$ was determined in particular taking into account a clearance S. In addition, $Z_H \in \mathbb{N}$. Preferably, $1 \leq Z_H \leq 5$, and particularly preferably $2 \leq Z_H \leq 4$. In addition, this dimensioning allows the height of the frame to be such that above and/or below the processing unit a free space remains within the standard transport container, the extension of which free space in the vertical direction is in particular less than $L_L/N_L$ or $L_Q/N_Q$. In this free space, supply conduits for material, energy and/or information can be provided which can readily be accessibly connected to different processing units.

The minimal extension $d_{min}$ of the frame in the longitudinal direction and/or in the transverse direction for a total extension L of the interior of the standard transport container in the longitudinal direction and/or in the transverse direction and an integral division N, taking into account a clearance S is determined according to $d_{min} = (L-(N+1)S)/N$, wherein, in particular 1 mm≤S≤50 mm, preferably 2 mm≤S≤30 mm, further preferably 3 mm≤S≤20 mm, and particularly preferably 4 mm≤S≤15 mm. As a result, this gives for the longitudinal direction $d_{L,min} = (L_L-(N_L+1)S_L)/N_L$ and in the transverse direction $d_{Q,min} = (L_Q-(N_Q+1)S_Q)/N_Q$. As result of the clearance, the individual processing units are more readily accessible, and in particular can be handled more readily during installation and/or demounting. In addition, if necessary, a better passive cooling of the processing unit results. As a result, in particular heat accumulation is avoided in the case of electrically operated components for operating the operating unit.

Particularly preferably, the minimal extension $d_{L,min}$ of the frame in the longitudinal direction corresponds substantially to the minimal extension $d_{Q,min}$ of the frame (22) in the transverse direction, wherein, in particular, the minimal height $d_{H,min}$ of the frame corresponds substantially to the minimal extension $d_{L,min}$ of the frame in the longitudinal direction and/or the minimal extension $d_{Q,min}$ of the frame in the transverse direction. The minimum storage space for the processing unit can thereby be configured to be substantially square. This permits the processing unit to be fixed offset by 90° in the standard transport container, as a result of which the connection and accessibility of differing processing units is simplified. For example, a plurality of processing units can be arranged in the longitudinal direction and transverse direction within the standard transport container in an L shape.

In particular, within the frame, in particular below the operating unit, a wastewater conduit that is connected to the operating unit or is unconnected to the operating unit is provided, wherein the wastewater conduit has at least one, preferably at least two, tube flange(s) facing laterally out of the frame. Materials that are no longer needed and/or unwanted products can thereby be fed to the wastewater conduit by gravity, wherein it is possible to provide differing conduits for differing material streams. In this case, it is possible that this wastewater conduit is conjointly used by the processing unit, wherein the wastewater conduit, in a suitable form, is connected to the operating unit. In particular, it is possible that the wastewater conduit is provided for the transit of a material stream from a different processing unit. As a result, from one processing unit which is positioned comparatively remotely from an associated outlet and/or an associated store, one material stream can readily be passed through other processing units positioned in-between. For this purpose, it is not particularly necessary to provide a separate conduit conducted through the corresponding processing units. Instead, a processing unit which does not require this wastewater conduit for its own operating unit can also provide a corresponding part of the conduit section required via its own wastewater conduit.

Preferably, at least one conveying unit that is connected to the operating unit or is unconnected to the operating unit is provided for material transport from and/or to an adjacent processing unit. The conveying unit can, in particular, compensate for a pressure drop in the material transport occurring within the processing unit and/or, to build up a corresponding high conveying pressure, can overcompensate. In particular, if a material transport is to be performed by a plurality of serially arranged processing units, the conveying unit can ensure that, independently of the total conveying section, a desired conveying pressure can be maintained. The dimensioning of the conveying unit of the processing unit can thereby proceed substantially independently of the pressure drop to be expected over the entire conveying section. This facilitates the exchangeability and reusability of the processing unit for different chemical reactions.

Particularly preferably, the frame is connected to a base, wherein the base is positioned via feet spaced apart from the substrate for fastening to a substrate. Via the feet, the frame and thereby the processing unit can be connected, for example, firmly but detachably to the substrate. Via the spaced arrangement of the base to the substrate, a gap defined substantially by the vertical extension of the feet remains, which can be used, as required, for other purposes, for example for laying power cables for operating measuring instruments. In particular, it is possible to provide bracing transverse beams which can increase the stability of the standard transport container and can carry off the weight of the processing units preferably connected to the transverse beams. The center lines of the transverse beams are preferably spaced apart from one another by $d_{L,min}$ or $d_{Q,min}$. In particular, the spacing of base to the substrate permits an easy visual inspection of the substrate, as a result of which leaks or other defects of the processing unit can readily be recognized. In addition, it is possible to access the processing unit from underneath using a forklift and to transport it readily, as a result of which conversion of the system structure is simplified. Preferably, the dimensions of the base substantially correspond to the dimensions of a standard pallet or a quarter of the dimensions of a standard pallet, in such a manner that the transport of the processing units using a forklift and/or the storage of a relatively large processing unit or the storage of a plurality of relatively small processing units on a standard pallet is simplified. In particular, it is possible to move a plurality of relatively small processing units which are stored on one standard pallet together using a forklift. Preferably, the frame of the processing unit is dimensioned with respect to mechanical stability in such a manner that pallets containing processing units can be stacked one above the other. Such a mechanical stability of the frame is generally sufficient to prevent irreparable deformation of the frame and/or the processing unit, even in the event of an explosion within the standard transport container.

In particular, support apparatuses, in particular measuring appliances that are connected to the operating unit are provided beneath the operating unit for operation of the operating unit. The processing unit can in particular have, over a defined height, the support region, for example for measuring appliances or wastewater conduits, over a defined height an operating region for the operating unit, and over a defined height, an interface region for connection of the processing unit to a supply grid for material and/or energy and/or information. If these regions are provided substantially at the same height for all processing units used, the exchangeability and reusability of the processing unit for different chemical reactions is further improved. In particular, the operating unit can be situated on a part of a measuring appliance that can measure, for example, using an extension measuring strip, the weight of the operating unit. A filling level, for example, can be measured thereby. In addition, it is possible using a measuring appliance to measure a volumetric flow rate and/or control it.

Preferably, an interface module that is connected to the operating unit is provided above the operating unit for the accommodation of material and/or energy and/or information. This makes it possible to provide the operating unit of the processing unit overhead with a mass transfer and/or energy exchange and/or information exchange. As a result, a plurality of processing units can be linked to one another overhead particularly simply and/or connected particularly simply to a shared supply grid. For example, the supply grid connected via the interface module can have a data bus which makes available information, in particular measurement results, to other processing units, as a result of which improved control, in particular feed-forward control, is permitted for the attached processing unit in dependence of the state of the other processing units. In addition, via the interface module, electrical energy, steam, compressed air or the like can be taken off from the supply grid as required. Preferably, the interface module has a controller which, for example in reaction to a control signal of a controller, permits a defined exchange with the supply grid, in particular for mass transfer.

The invention further relates to a use of a plurality of processing units, which can be constructed and developed as described hereinbefore, that are connected to one another directly or indirectly in a shared standard transport container, in particular as specified in DIN ISO 668, for construction of a production system for carrying out a chemical reaction. It is possible thereby to make available different processing units for different process engineering unit operations in a pool, and, depending on the required system structure to assemble them flexibly for the synthesis of a defined chemical product in modular fashion in the standard transport container, as a result of which carrying out different chemical reactions with low expenditure is made possible.

Hereinafter, the invention will be explained by way of example with reference to the accompanying drawings on the basis of preferred exemplary embodiments, wherein the features shown hereinafter can each individually, and also in combination, represent an aspect of the invention. In the drawings:

BRIEF DESCRIPTION OF THE DRAWINGS

An interior of the standard transport container 10 of the 1C type as specified in DIN ISO 668 shown in FIG. 1 has, in the longitudinal direction, an extension of $L_L$=5867 mm, in the transverse direction an extension $L_Q$=2300 mm, and a height of $L_H$=2197 mm. The extension $L_L$ is subdivided in the longitudinal direction into $N_L$=10 substantially equally-sized notional logical units, in such a manner that for each logical unit a section in the longitudinal direction of substantially $d_{L,min}$=570 mm results. The extension $L_Q$ in the transverse direction is subdivided into $N_Q$=4 substantially equally-sized notional logical units, in such a manner that for each logical unit a section in the transverse direction of likewise substantially $d_{Q,min}$=570 mm results. As shown in FIG. 2, in the interior of the standard transport container 10, a plurality of processing units 12 can be arranged, which are oriented according to the notional stepwise increment of the standard transport container 10. This means that each of the processing units 12 provided has, in the longitudinal direction, an extension of $d_L$, and in the transverse direction, an extension of $d_Q$, which in each case is substantially an integral multiple of $d_{L,min}$, or $d_{Q,min}$, respectively. For the processing unit 12, in addition, a minimal height of $d_{H,min}=570$ mm is preset, in such a manner that the smallest processing unit 12 has the height of a cube having an edge length of 570 mm. The dimensions of larger processing unit 12 used substantially correspond to an integral multiple of this cube.

Figure 1:
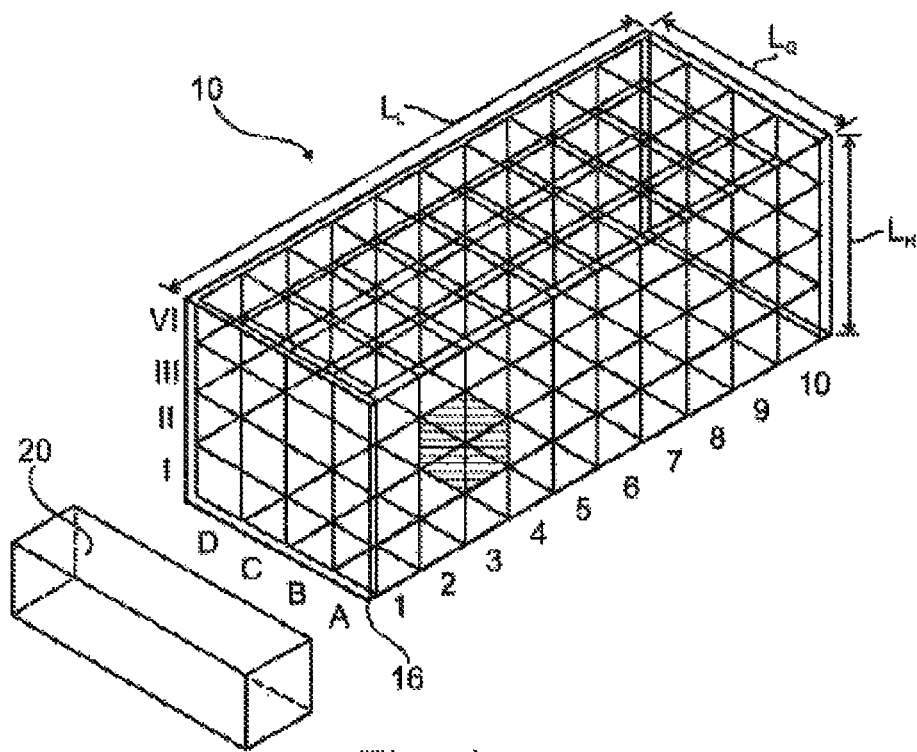
FIG. 1: shows a schematic perspective conceptual view of a standard transport container.
Figure 2:
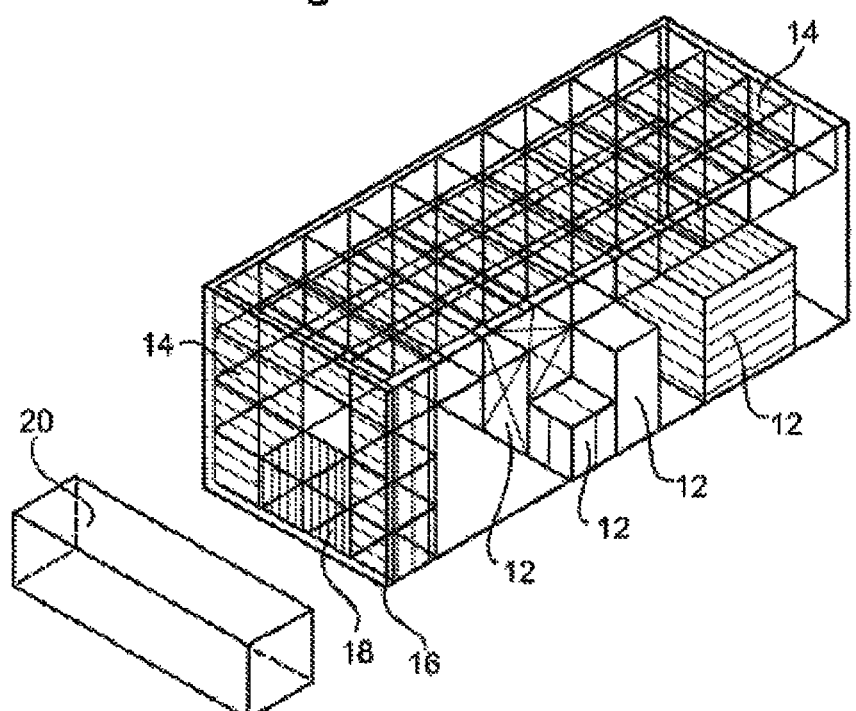
FIG. 2: shows a schematic perspective conceptual view of the standard transport container of FIG. 1 having different conceptionally shown processing units.

By selecting the minimum height for the processing unit 12 of $d_{H,min}=570$ mm, for the processing unit 12, a maximum height can be provided which can be a multiple of $d_{H,min}$ by the factor $Z_H$32 3, in order still to fit into the interior of the standard transport container 10. As a result, there remains, in the exemplary embodiment shown, an upper region having a height of 460 mm. This region is large enough in order to provide there a supply grid 14 which, at virtually any desired position within the standard transport container 10, can supply the respective processing unit 12 overhead with material, energy and/or information. The upper region is particularly free from parts of the processing unit 12. However, it is possible that the supply grid 14 leaves sufficient volume free in the upper region that a processing unit 12 can protrude into the volume of the upper region left free. The supply grid extends, in particular, over a volume at an end face 16 of the standard transport container 10 which corresponds to the predetermined stepwise increment, or can have an extension deviating therefrom in the longitudinal direction. At this end face 16 of the standard transport container 10, a multicoupling 18 connected to the supply grid can be provided, via which the standard transport container 10 can be docked to a docking station 20. The docking station 20 can in turn be connected to a backbone structure with which material, energy and/or information can be exchanged via the multicoupling 18 and the docking station 20. In particular, the standard transport container 10 can be supplied thereby with sufficient material, energy and/or information to carry out a chemical reaction using the processing unit 12 provided in the standard transport container 10. The products and/or residues and wastes can be optionally fed after the chemical reaction has been carried out, via the multicoupling 18 and/or to the multicoupling 18, to separate connections and the docking station 20 of the backbone structure. In particular, it is possible to carry out the chemical reaction within the standard transport container 10 autonomously, that is to say the standard transport container 10 can be positioned separately from the docking station 20 when the chemical reaction, in particular a chemical batch reaction and/or a continuous reaction, is carried out.

Figure 3:
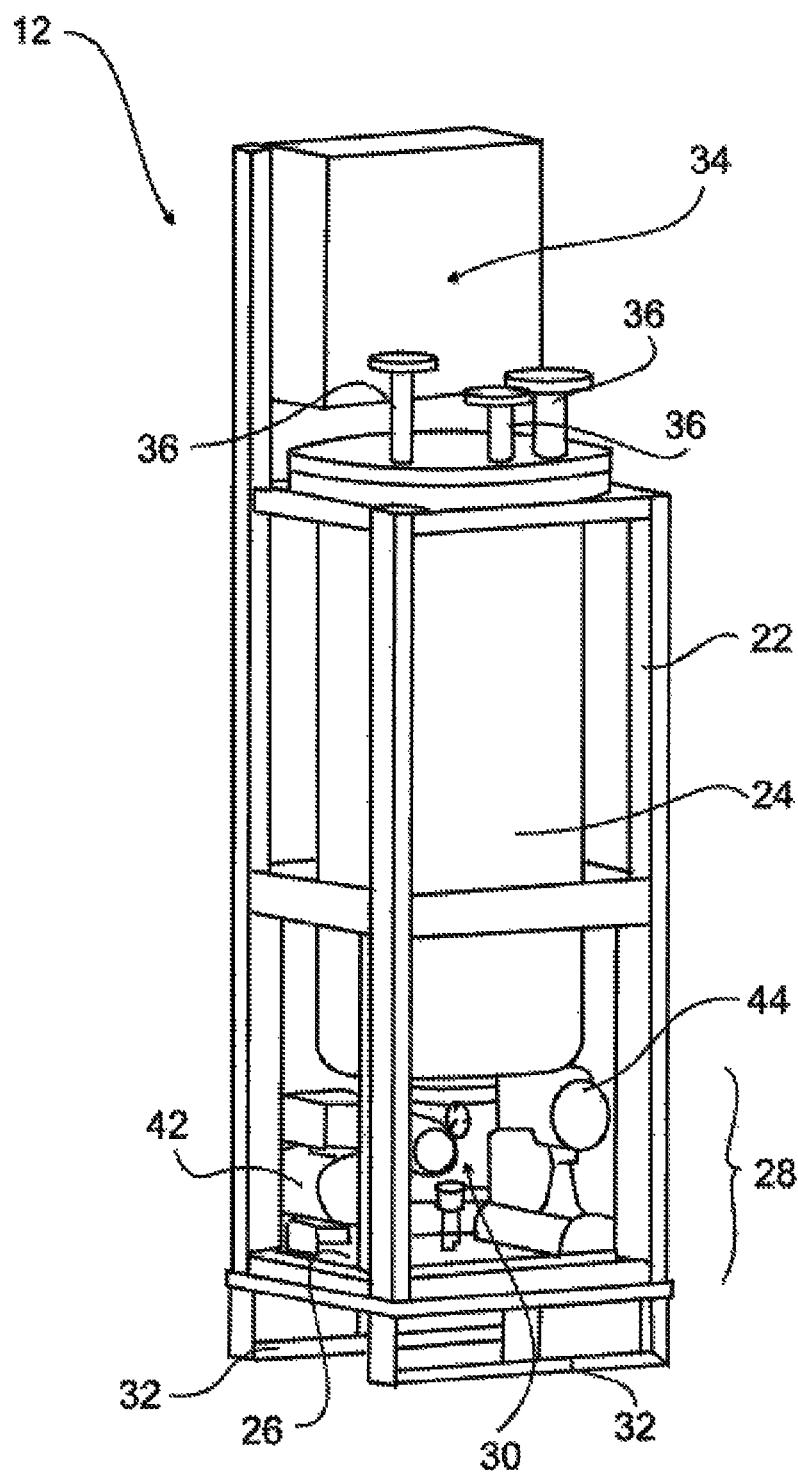
FIG. 3: shows a schematic perspective view of one example of a processing unit for the standard transport container of FIG. 1, FIG. 4: shows a schematic perspective view of a lower region of a processing unit for the standard transport container of FIG. 1, and FIG. 5: shows a schematic perspective view of a support region of a processing unit for the standard transport container of FIG. 1.

The processing unit 12 shown in FIG. 3 has a frame 22 which limits the extension of the processing unit 12 in the longitudinal direction and in the transverse direction. An operating unit 24 is inserted into the frame 22, which operating unit 24 is configured, for example, as a reactor or stirred tank. Below the operating unit 24, there is provided, between the operating unit 24 and a base 26 connected to the frame 22, a support region 28 in which support apparatuses, for example measuring instruments 30 for monitoring and/or controlling operating parameters of the operating unit 24 are arranged. Feet 32 are connected to the base 26 and/or to the frame 22, via which feet the frame 22 and thereby the processing unit 12 can be fixed in the standard transport container 10. Above the operating unit 24 is provided an interface module 34, via which the operating unit 24 can be connected to the supply grid 14. In particular, the interface module 34 contains the controller and process-control technology provided for operating the operating unit 24, wherein, in particular, information on the status of the operating unit 24 can be transmitted via the interface module to the supply grid 14, in order to permit access to this information for further processing units 12. A mass transfer between the operating unit 24 and the supply grid 14 can proceed, for example, via piping 36 that can be connected to one another.

Figure 4:
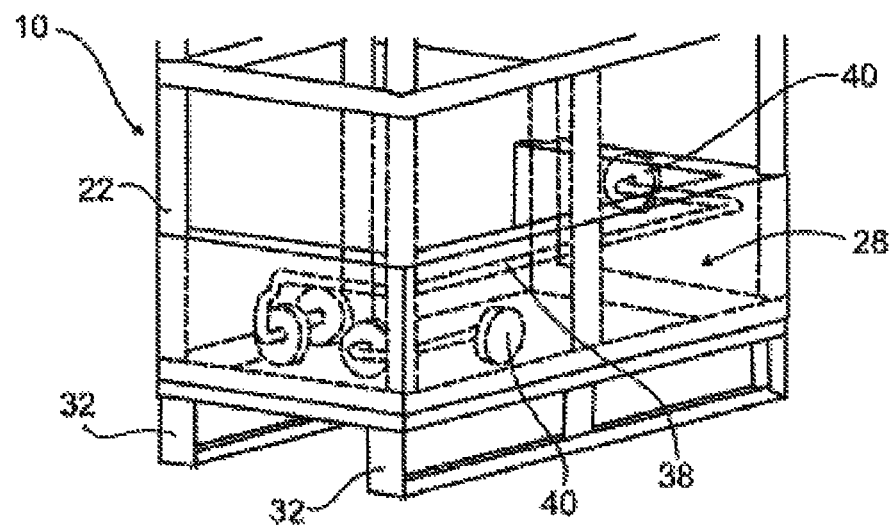
Figure 5:
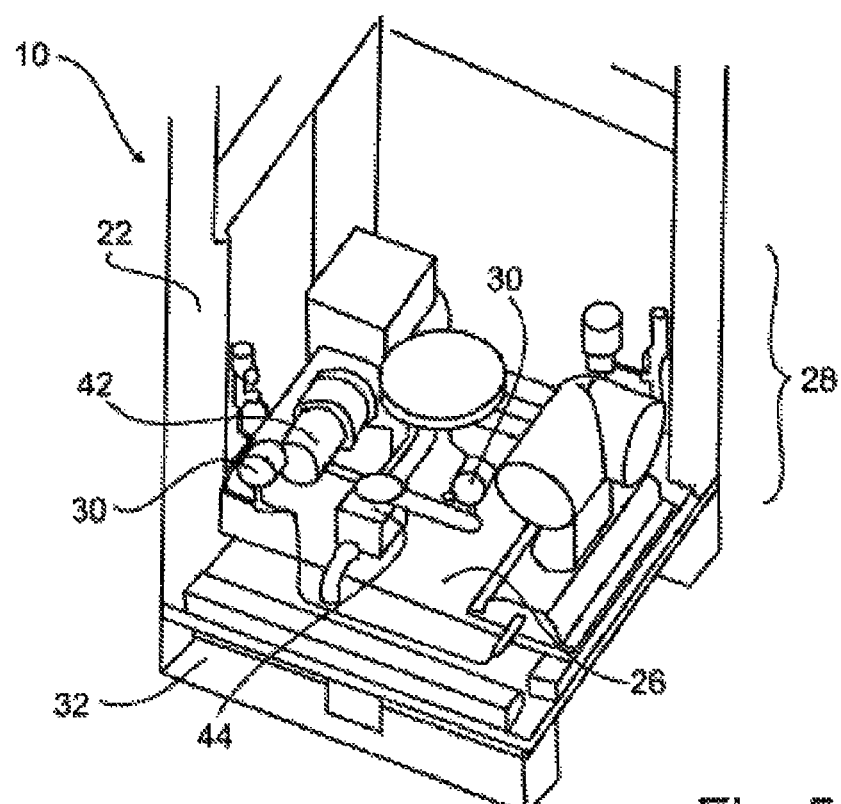

As shown in FIG. 4, in the support region 28, in particular a wastewater conduit 38 can be provided which need not necessarily be connected to the operating unit 24 of the processing unit 12 shown. The wastewater conduit 38 can have at two or more points a tube flange 40, via which the wastewater conduit 38 can be connected to a corresponding wastewater conduit 38 of an adjacent processing unit 12. This permits wastewater, product, or other materials to be transported from a processing unit 12 via wastewater conduits 38 connected to one another through a plurality of processing units 12 to an intended site. As shown in FIG. 5, for this purpose, the processing unit 12, in particular a plurality of, or even all of the processing units provided in the standard transport container 10, have a conveying unit 42, for example a pump. The conveying unit 42 can compensate in particular for pressure drops occurring temporarily in the wastewater conduit 38. In addition, in the support region 28, a support unit can be provided in the form of a filter appliance 44, for example in order to free a product from undesired solid particles.

The invention claimed is:

1. A processing unit for supporting and/or carrying out a process engineering unit operation for a chemical reaction, having
    an operating unit (24) for providing a contribution to the process engineering unit operation
    a frame (22) for accommodating the operating unit (24), and,
    a wastewater conduit (38) having at least two tube flanges provided within the frame (22) below the operating unit (24); wherein the wastewater conduit (38) is optionally connected to the operating unit;
    wherein the frame (22) has an extension $d_L$ in the longitudinal direction which corresponds substantially to an integral multiple $Z_L$ of an integral portion $N_L$ of an extension $L_L$ in the longitudinal direction of an interior of a standard transport container (10), as specified in DIN ISO 668, and/or the frame (22) has an extension $d_Q$ in the transverse direction which corresponds substantially to an integral multiple $Z_Q$ of an integral portion $N_Q$ of an extension $L_Q$ in the transverse direction of an interior of a standard transport container (10), as specified in DIN ISO 668.

2. The processing unit as claimed in claim 1, wherein the frame (22) has a height $d_H$ which corresponds substantially to an integral multiple $Z_H$ of the integral portion $N_L$ of the extension $L_L$ in the longitudinal direction or of the integral portion $N_Q$ of the extension $L_Q$ in the transverse direction of the interior of the standard transport container (10).

3. The processing unit as claimed in claim 1 wherein the minimal extension $d_{min}$ of the frame (22) in the longitudinal direction and/or in the transverse direction for a total extension L of the interior of the standard transport container (10) in the longitudinal direction and/or in the transverse direction and an integral division N, taking into account a clearance S is determined according to $d_{min}=(L-(N+1)S)/N$, wherein 1 mm $\leq S \leq$ 50 mm.

4. The processing unit as claimed in claim 1, wherein the minimal extension $d_{L,min}$ of the frame (22) in the longitudinal direction corresponds substantially to the minimal extension $d_{Q,min}$ of the frame (22) in the transverse direction, wherein the minimal height $d_{H,min}$ of the frame (22) corresponds substantially to the minimal extension $d_{L,min}$ of the frame (22) in the longitudinal direction and/or the minimal extension $d_{Q,min}$ of the frame (22) in the transverse direction.

5. The processing unit as claimed in claim 1, wherein at least one conveying unit (42) that is connected to the operating unit (24) or is unconnected to the operating unit (24) is provided for material transport from and/or to an adjacent processing unit (12).

6. The processing unit as claimed in claim 1, wherein the frame (22) is connected to a base (26), wherein the base (26) is positioned via feet (32) spaced apart from the substrate for fastening to a substrate.

7. The processing unit as claimed in claim 1, wherein measuring appliances (30) that are connected to the operating unit (24) are provided beneath the operating unit (24) for operation of the operating unit (24).

8. The processing unit as claimed in claim 1, wherein an interface module (34) that is connected to the operating unit (24) is provided above the operating unit (24) for the accommodation of material and/or energy and/or information.

9. A production system for carrying out a chemical reaction comprising a plurality of processing units (12) as claimed in claim 1 that are connected to one another directly or indirectly in a shared standard transport container (10), as specified in DIN ISO 668.

10. The production system as claimed in claim 9 wherein at least one of the wastewater conduits is connected to at least one of the plurality of processing units.

11. The production system as claimed in claim 10 wherein at least one of the wastewater conduits is connected to at least two of the plurality of processing units.

12. The processing unit as claimed in claim 1 wherein the wastewater conduit (38) is connected to the operating unit.

13. The processing unit as claimed in claim 1 wherein the wastewater conduit (38) is not connected to the operating unit.

14. The processing unit as claimed in claim 1 wherein the frame (22) has an extension $d_L$ in the longitudinal direction which corresponds substantially to an integral multiple $Z_L$ of an integral portion $N_L$ of an extension $L_L$ in the longitudinal direction of an interior of a standard transport container (10), as specified in DIN ISO 668.

15. The processing unit as claimed in claim 1 wherein the frame (22) has an extension $d_Q$ in the transverse direction which corresponds substantially to an integral multiple $Z_Q$ of an integral portion $N_Q$ of an extension $L_Q$ in the transverse direction of an interior of a standard transport container (10), as specified in DIN ISO 668.

16. The processing unit as claimed in claim 3 wherein the clearance S ranges between 2 mm≤S≤30 mm.

17. The processing unit as claimed in claim 16 wherein the clearance S ranges between 3 mm≤S≤20 mm.

18. The processing unit as claimed in claim 17 wherein the clearance S ranges between 4 mm≤S≤15 mm.

\* \* \* \* \*